United States Patent
Ren et al.

(10) Patent No.: US 7,640,144 B2
(45) Date of Patent: Dec. 29, 2009

(54) METHOD FOR SIMULATING A HYDROFORMING PROCESS

(75) Inventors: Feng Ren, Canton, MI (US); Zhiyong Cedric Xia, Canton, MI (US); Dan Zeng, Canton, MI (US)

(73) Assignee: Ford Global Technologies, Dearborn, MI (US)

( * ) Notice: Subject to any disclaimer, the term of this patent is extended or adjusted under 35 U.S.C. 154(b) by 717 days.

(21) Appl. No.: 11/307,192

(22) Filed: Jan. 26, 2006

(65) Prior Publication Data

US 2007/0174025 A1 Jul. 26, 2007

(51) Int. Cl.
*G06F 17/50* (2006.01)
*B21D 24/00* (2006.01)
(52) U.S. Cl. .............................................. 703/2; 703/1
(58) Field of Classification Search ................ 703/2, 703/1; 148/526; 72/60, 61
See application file for complete search history.

(56) References Cited

U.S. PATENT DOCUMENTS 6,658,909 B2 * 12/2003 Juedes ........................... 72/61
2003/0005738 A1 * 1/2003 Juedes ........................... 72/61
2004/0200550 A1 * 10/2004 Pfaffmann et al. ........... 148/526
2006/0117825 A1 * 6/2006 Pfaffmann et al. ............. 72/60

OTHER PUBLICATIONS

"Optimization of Process and Tool Development for Hydroformed Frame Rail Using FEM Simulation", by Jay Liu & Don Hahn, ASE-2000-01-0408.
"Tube Hydroforming Process Development with the Aid of Computer Simulation", by Jay Liu, SAE-2001-01-1134, 2001.
"Cutting Lead-Time and Development Costs of Hydroformed Parts by FEM Simulation", by Rosanna Brun, Manuel Lai, Xiangping Li and Angelo Messina, SAE-1997-20-0090, 1997.

* cited by examiner

*Primary Examiner*—Thai Phan
(74) *Attorney, Agent, or Firm*—David Kelley; Jerome Drouillard

(57) ABSTRACT

A method for simulating a hydroforming process includes modeling a virtual hydroforming die and a virtual tubular workpiece. The virtual workpiece is placed within the die after the die has been expanded. The die is then contracted to a finished size while the workpiece is deformed into a non-circular cross section in contact with the virtual die. The workpiece is subsequently pressurized to simulate production of a finished part.

14 Claims, 3 Drawing Sheets

METHOD FOR SIMULATING A HYDROFORMING PROCESS

TECHNICAL FIELD

The present invention relates to a method for simulating a virtual hydroforming die and virtual workpiece, so as to accomplish the simulation of hydroforming as a single cohesive process.

BACKGROUND OF THE INVENTION

Hydroforming is a relatively new forming process wherein a tube is pressurized hydraulically and internally to deform the tube into a desired shape defined by a hydroforming die. The tube is first pre-bent and pre-formed and then mounted within the hydroforming die. While within the closed die the tube is pressurized hydraulically and is caused to deform plastically into a final finished profile.

Hydroforming offers several advantages over traditional stamp-and-weld fabrication processes, including improved structural strength and stiffness, as well as reduced tooling cost and improved dimensional accuracy. As noted above, a typical hydroforming process includes tube bending, pre-forming, pressurization, and post processing. In order to design and manufacture a hydroformed product cost effectively, numerical simulations are preformed in both the design stage and again in the manufacturing stage of the hydroformed part. Simulations are employed to satisfy three separate requirements. First, simulations are employed to assess design feasibility, with a focus being upon the selection of a proper tube for the finished workpiece. Second, simulation is used in the evaluation of a vehicle's functional attributes such as impact analysis and durability. This second type of simulation focuses upon workpiece or component thickness and deformation history for the hydroformed product, with initial results being used in subsequent vehicle performance analyses. Finally, hydroforming simulations are used for manufacturing purposes, such as tooling and process design.

Known hydroforming-modeling practices follow the sequential physical process and take a very long time, on the order of weeks, of demanding, tedious computer-aided engineering work. One important part of this work includes the set-up and modeling of the pre-form process during which a tube is deformed at different local positions in order to fit it into the hydroforming die. This step of the process traditionally takes a large amount of time.

The present invention greatly reduces the amount of time needed to simulate a hydroforming process, while improving the accuracy of the modeled process and the production capability to manufacture the modeled hydroformed component.

SUMMARY OF THE INVENTION

A method for simulating a hydroforming process includes the steps of modeling a virtual hydroforming die in a closed configuration and a finished size, and modeling a virtual tubular workpiece. The virtual hydroforming die is expanded from its finished size until the virtual workpiece fits within the expanded die. Then, the virtual die, including the incased workpiece, is shrunk to the finished die size. Then, the workpiece is pressurized within the die to further form the workpiece. The workpiece may comprise either a straight or a pre-bent tube. According to another feature of the present invention, the virtual die is expanded circumferentially, but not axially, in order to accommodate the virtual tubular workpiece. The virtual die is expanded such that the spatial orientation of a plurality of normal elements of the die is maintained generally constant. Said another way, the hydroforming die is first expanded radially with respect to a central axis, and then shrunk radially with respect to the same axis, so as to simulate plastic deformation of the workpiece.

Following hydraulic pressurization of the workpiece within the virtual die, the workpiece is compared dimensionally with a predetermined, multi-dimensional finished profile for the workpiece.

It is an advantage of a method according to present invention that a hydroformed part may be developed much quicker and at much less expense than with known hydroforming models.

It is a further advantage of a method according to present invention that the present hydroforming model is much less complicated and needs many fewer steps than known hydroform modeling.

Other advantages, as well as features and objects of the present invention, will become apparent to the reader of this specification.

DETAILED DESCRIPTION OF THE PREFERRED EMBODIMENTS

Figure 1:
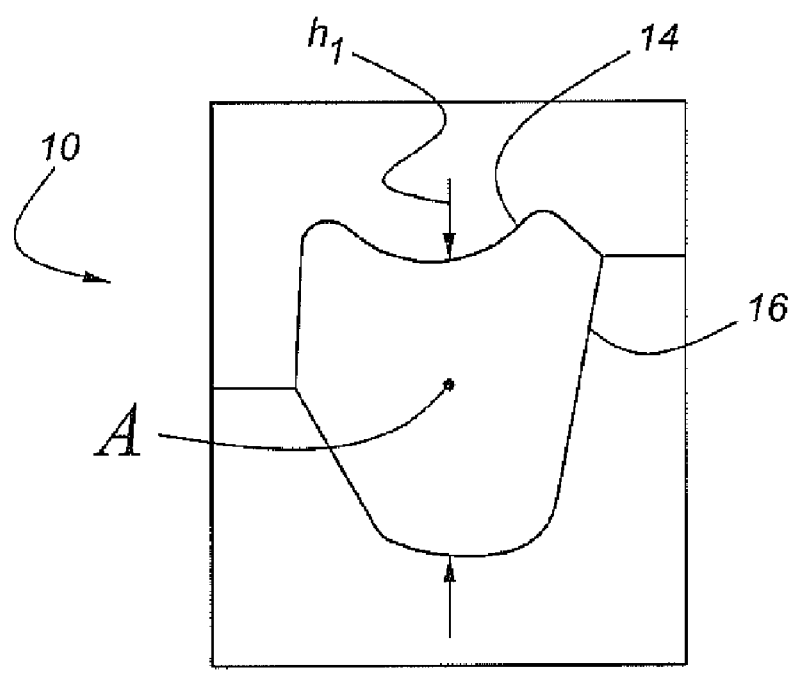
FIG. 1 is a drawing of a virtual hydroforming die produced according to a model employing either implicit finite element analysis or another simulation technique known to those skilled in the art and suggested by this disclosure.

As shown in FIG. 1, virtual hydroforming die 10 includes upper die 14 and lower die 16. Die 10 has a longitudinal axis, A. Axis A is, in general, not straight, but assumes a three dimensional spatial shape. Die 10 may be modeled or simulated by a computer using any of a variety of finite element analyses known to those skilled in the art and suggested by this disclosure, such as surface element, volume element, or other contact element. The model of die 10 may be of a rigid type or with high stiffness. Regardless of the type of finite element analysis modeling used, die 10 has a finished size, $h_1$, where $h_1$ represents a characteristic one of a plurality of dimensions associated with a physical die used to produce a finished part.

Figure 2:
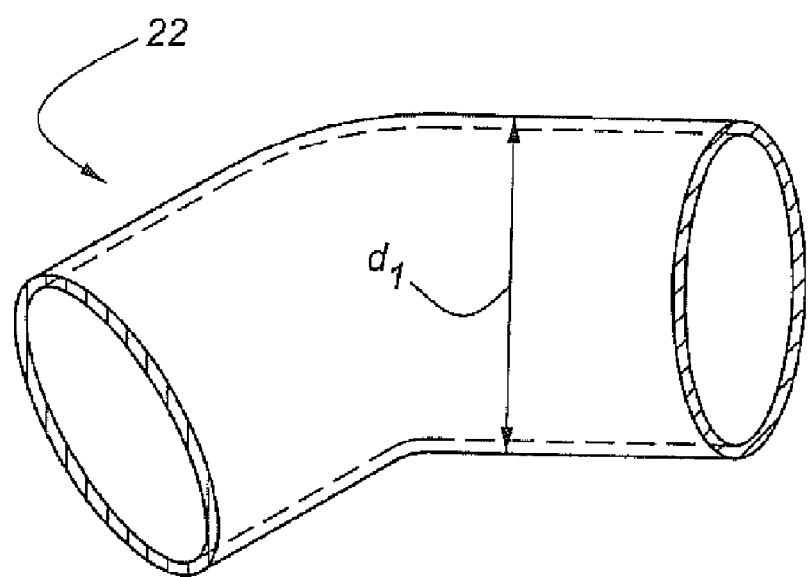
FIG. 2 is a representation of a virtual tubular workpiece having a diameter $d_1$.

FIG. 2 illustrates a virtual tubular workpiece, 22, which has been pre-bent to fit within the contour of virtual hydroforming die 10. Tubular workpiece 22 may be modeled or simulated by a computer using any of a variety of finite element analyses known to those skilled in the art and having appropriate mechanical properties. Further, all of the steps in the current inventive process may be performed with the aid of a suitable computer drawn from the class of computers used for finite element simulations by those skilled in the art.

Figure 3:
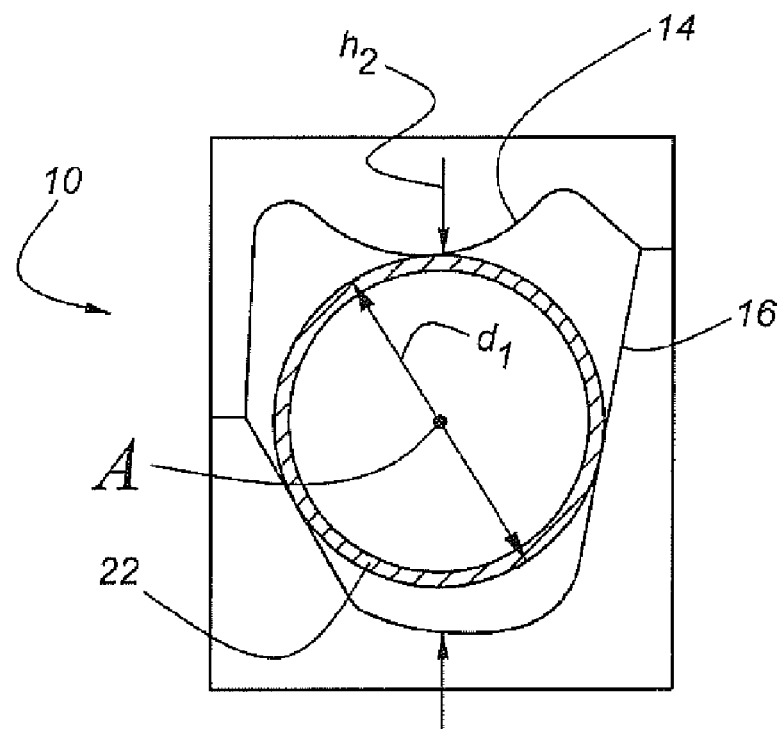
FIG. 3 shows the virtual hydroforming die of FIG. 1 expanded to accommodate virtual tubular workpiece 22.

In FIG. 3, die 1 0 has been expanded radially about axis A to accommodate tube 22 at its full diameter, $d_1$. Note that in FIG. 3, die 10 is in a closed position because the entire die, which is generally modeled either as a rigid body, or at least a high stiffness body, has been expanded to accommodate diameter $d_1$ of tubular workpiece 22. This expansion is required because tube 22 is too large to be accommodated with die 10 in the finished size shown in FIG. 1.

Figure 4:
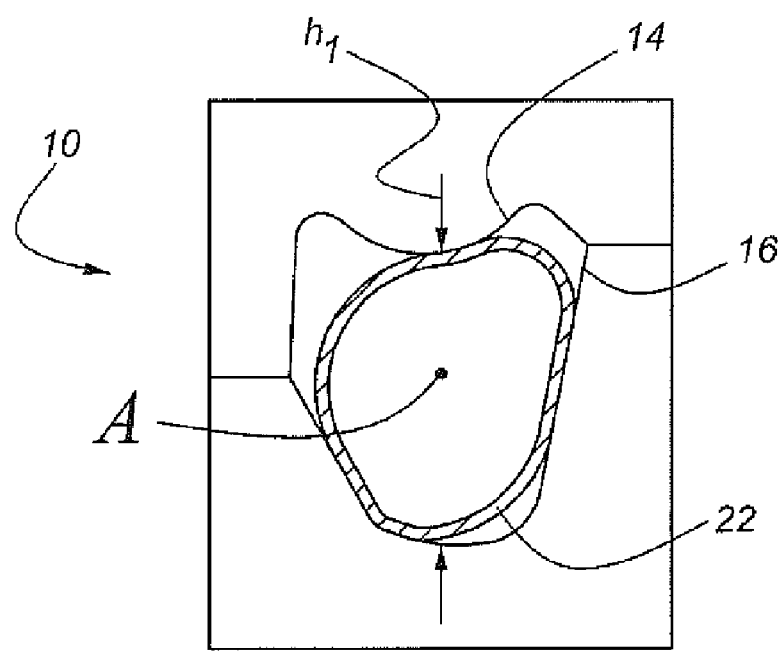
FIG. 4 illustrates virtual die 10 being shrunk to its original size as shown in FIG. 1, with virtual die 10 having a virtual tubular workpiece which is plastically deformed to fit inside the shrunk virtual die.

In FIG. 4, die 10 has been shrunk so that dimension $h_1$ has been restored. As part of the shrinking process, virtual tubular workpiece 22 has been pre-formed into a non-circular cross section having contact with various points about the circumference of tube 22 in contact with upper die 14 and lower die 16. Thus, the act of shrinking die 10 as the process moves from FIGS. 3 to 4 accomplishes the preforming process.

Figure 5:
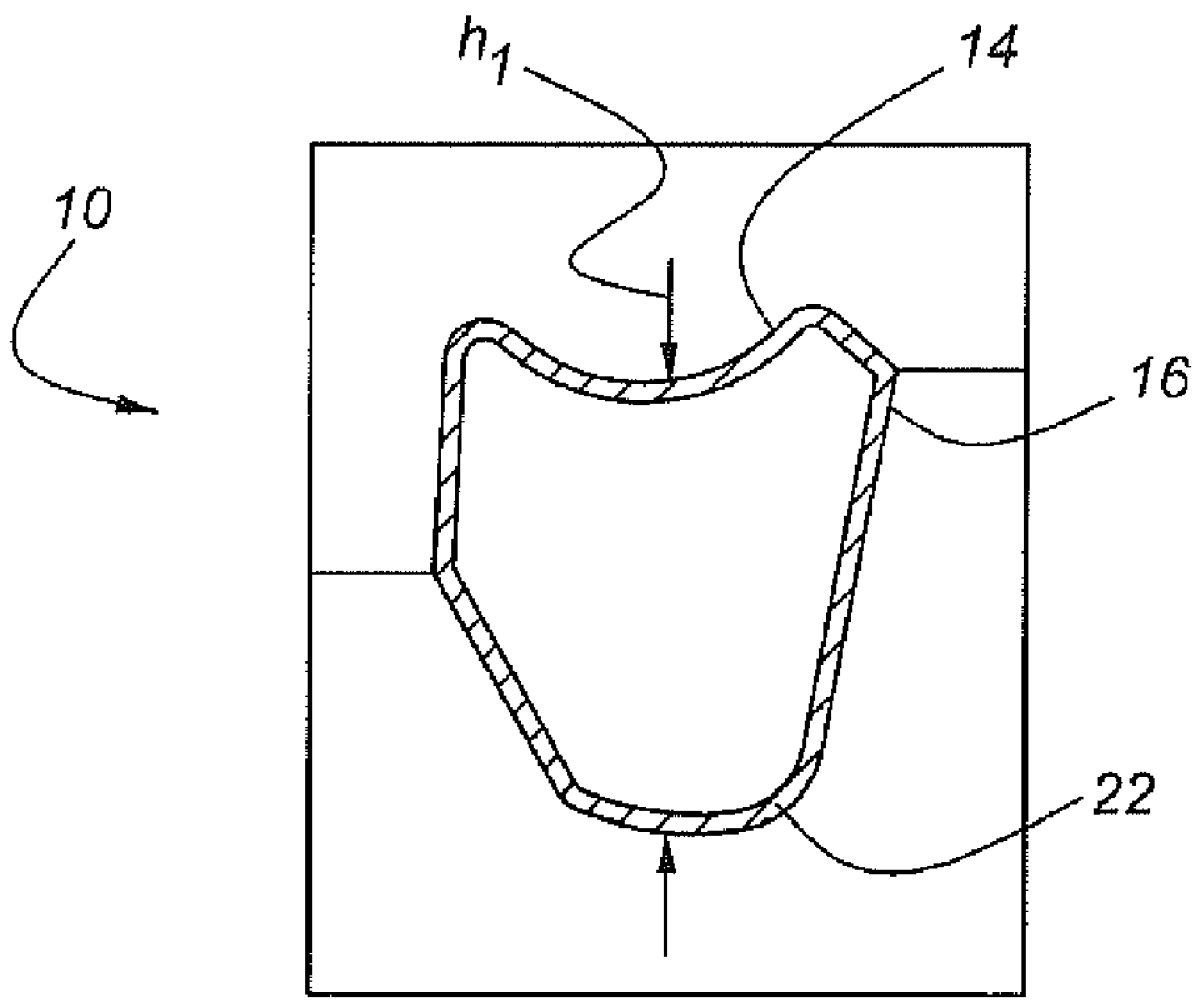
FIG. 5 illustrates virtual die 10 and virtual tubular workpiece 22 following pressurization of workpiece 22, with die 10 being at its finished size.

In FIG. 5, virtual tubular workpiece 22 has been expanded hydraulically to assume the contours of upper die 14 and lower die 16. Having been expanded, workpiece 22 may be compared with predetermined dimensions for the final workpiece to determine whether the modeling needs correction.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A method for simulating a hydroforming process, comprising the steps of:
    modeling a virtual hydroforming die in a closed configuration and a finished size;
    modeling a virtual tubular workpiece;
    expanding the virtual hydroforming die from said finished size until said virtual workpiece fits within said die;
    shrinking said die, including said workpiece, to said finished size; and
    pressurizing said workpiece within said die to further form the workpiece.

2. A method according to claim 1, wherein said virtual tubular workpiece comprises a pre-bent tube.

3. A method according to claim 1, wherein said virtual die is expanded circumferentially, but not axially, in order to accommodate the virtual tubular workpiece.

4. A method according to claim 1, wherein said virtual die is expanded such that the spatial orientation of a plurality of normal elements of said die is maintained generally constant.

5. A method according to claim 1, wherein said modeling is performed as a finite element analysis.

6. A method for simulating the production of a tubular component by a hydroforming process, comprising the steps of:
    modeling a virtual hydroforming die in a closed configuration and a finished size;
    modeling a virtual tubular workpiece as a pre-bent tube;
    expanding the virtual hydroforming die circumferentially from said finished size, until said virtual workpiece fits within said die;
    shrinking said virtual die to said finished size, while simultaneously pre-forming said virtual workpiece; and
    hydraulically pressurizing said virtual workpiece within said virtual die to further form the workpiece.

7. A method according to claim 6, wherein said virtual die is expanded such that the spatial orientation of a plurality of elements of said die is maintained generally constant.

8. A method according to claim 6, wherein said virtual hydroforming die is first expanding radially with respect to a central axis and then shrunk radially with respect to said central axis, thereby plastically deforming said workpiece.

9. A method according to claim 6, further comprising the step of comparing the virtual workpiece following pressurization with a predetermined, multi-dimensional, finished profile for said workpiece.

10. A method according to claim 6, wherein each of said steps is performed within a computer using finite element analysis.

11. A system for simulating a hydroforming process, comprising:
    means for modeling a virtual hydroforming die in a closed configuration and a finished size;
    means for modeling a virtual tubular workpiece;
    means for expanding the virtual hydroforming die from said finished size until said virtual workpiece fits within said die;
    means for shrinking said die containing said workpiece, to said finished size; and
    means for pressurizing said workpiece within said die to further form the workpiece.

12. A method according to claim 11, wherein said virtual tubular workpiece comprises a pre-bent tube.

13. A method according to claim 11, wherein said virtual die is expanded circumferentially, but not axially, in order to accommodate the virtual tubular workpiece.

14. A method according to claim 11, wherein said virtual die is expanded such that the spatial orientation of a plurality of normal elements of said die is maintained generally constant.

* * * * *